United States Patent
Mater, Jr. et al.

(10) Patent No.: US 7,997,608 B2
(45) Date of Patent: Aug. 16, 2011

(54) PIN BOX ASSEMBLY FOR TRAILER

(75) Inventors: Robert F. Mater, Jr., Elkhart, IN (US); Gomer B. Jones, Elkhart, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 805 days.

(21) Appl. No.: 11/762,273

(22) Filed: Jun. 13, 2007

(65) Prior Publication Data
US 2008/0042398 A1    Feb. 21, 2008

Related U.S. Application Data

(63) Continuation-in-part of application No. 11/451,670, filed on Jun. 13, 2006, now Pat. No. 7,530,591.

(51) Int. Cl.
*B60D 1/60* (2006.01)
(52) U.S. Cl. .................. 280/507; 280/474; 280/433
(58) Field of Classification Search .................. 280/474, 280/433, 432, 457, 504, 507
See application file for complete search history.

(56) References Cited

U.S. PATENT DOCUMENTS

| | | | |
|---|---|---|---|
| 2,351,151 A | 6/1944 | Sattler | |
| 3,328,051 A * | 6/1967 | Hope et al. | 280/432 |
| 3,592,488 A * | 7/1971 | Holloway et al. | 280/262 |
| 3,667,778 A * | 6/1972 | Hope | 280/432 |
| 3,695,213 A | 10/1972 | Littlefield | |
| 3,792,432 A | 2/1974 | Ellis et al. | |
| 3,897,086 A | 7/1975 | Breford | |
| 4,119,330 A * | 10/1978 | Capps | 280/432 |
| 4,131,296 A | 12/1978 | Strader | |
| 5,243,434 A * | 9/1993 | Nodama | 348/827 |
| 5,328,198 A | 7/1994 | Adams | |
| 5,403,031 A | 4/1995 | Gottschalk et al. | |
| 5,785,341 A * | 7/1998 | Fenton | 280/441 |
| 5,890,728 A * | 4/1999 | Zilm | 280/433 |
| 6,170,849 B1 | 1/2001 | McCall | |
| 6,170,850 B1 | 1/2001 | Works | |
| 6,186,530 B1 * | 2/2001 | Zilm | 280/496 |
| 6,375,211 B1 | 4/2002 | Mackarvich | |
| 6,581,951 B2 | 6/2003 | Lange | |
| 6,726,396 B2 | 4/2004 | Plett | |
| 6,746,037 B1 | 6/2004 | Kaplenski et al. | |
| 6,854,757 B2 | 2/2005 | Rehme | |
| 6,877,757 B2 | 4/2005 | Hayworth | |

(Continued)

OTHER PUBLICATIONS

U.S. Appl. No. 11/762,268 Non-Final Office Action mailed Jul. 9, 2009.

(Continued)

*Primary Examiner* — Paul N Dickson
*Assistant Examiner* — Tashiana Adams
(74) *Attorney, Agent, or Firm* — Woodard, Emhardt, Moriarty, McNett & Henry LLP

(57) ABSTRACT

An extension coupling for interconnecting a trailer to a tow hitch carried on a tow vehicle includes an elongated arm having a first end and a second end. The first end is pivotally connected to the trailer. A king pin is connected to the second end. The king pin includes a projecting stop that engages the tow hitch to strictly limit pivoting movement of the elongated arm relative to the tow hitch. In one possible embodiment, the elongated arm is a pin box assembly.

20 Claims, 15 Drawing Sheets

U.S. PATENT DOCUMENTS

| | | |
|---|---|---|
| 6,913,276 B1 | 7/2005 | Bauder |
| 6,957,823 B1 | 10/2005 | Allen |
| 6,971,660 B1 | 12/2005 | Putnam |
| 6,986,524 B2 * | 1/2006 | Heitzmann ............... 280/433 |
| 6,986,624 B1 | 1/2006 | Heitzmann |
| 7,000,937 B2 * | 2/2006 | Dick ....................... 280/416.1 |
| 7,121,574 B2 | 10/2006 | Bouwkamp |
| 7,164,081 B1 | 1/2007 | Tollefson |
| 7,222,872 B1 | 5/2007 | Bauder |
| 7,530,591 B2 * | 5/2009 | Mater et al. ................ 280/507 |
| 2006/0043694 A1 | 3/2006 | Kaun |
| 2006/0201124 A1 * | 9/2006 | Hall et al. ..................... 56/16.7 |

OTHER PUBLICATIONS

International Patent Application No. PCT/US2008/066569 International Search Report and Written Opinion mailed Aug. 29, 2008.

U.S. Appl. No. 11/762,268 to Mater et al., Notice of Allowance mailed Dec. 31, 2009.

* cited by examiner

PIN BOX ASSEMBLY FOR TRAILER

This application is a continuation-in-part of U.S. patent application Ser. No. 11/451,670 filed on 13 Jun. 2006 now U.S. Pat. No. 7,530,591.

TECHNICAL FIELD

The present invention relates generally to the towing equipment field and, more particularly, to a new and improved extension coupling.

BACKGROUND OF THE INVENTION

The present invention relates to a new extension coupling for interconnecting a trailer to a tow hitch carried on a tow vehicle. In one embodiment, the extension coupling provides both softening in the vertical direction and anti-chucking in the longitudinal or horizontal direction so as to provide enhanced performance and a smoother ride. In effect the extension coupling acts as a buffer between the tow vehicle and the trailer, significantly reducing the negative impact of vertical shock and longitudinal chucking to provide an improved ride. The coupling relieves stress on the towing vehicle, trailer frame, cabinets, mechanicals and support mechanisms. The smoother ride also reduces fatigue for drivers and passengers in the towing vehicle.

SUMMARY OF THE INVENTION

In accordance with the purposes of the present invention as described herein, an extension coupling is provided for interconnecting a trailer to a tow hitch carried by a tow vehicle. The extension coupling comprises an elongated arm having a first end and a second end wherein the first end is pivotally connected to the trailer. In addition, the coupling includes a king pin connected to the second end of the elongated arm. The king pin includes a head, a neck and a base. A projecting stop projects from the base. The projecting stop engages the tow hitch to strictly limit pivoting movement of the elongated arm relative to the tow hitch.

More specifically describing the invention, the extension coupling further includes a trailer mount wherein the trailer mount is fixed to the trailer and the first end of the elongated arm is pivotally connected to the trailer mount by a pivot shaft. In one embodiment the trailer mount includes a mounting plate having a reinforcing rib and at least two projecting mounting flanges. The mounting plate further includes a hub that receives the pivot shaft. The reinforcing rib is arc shaped and extends concentrically around that hub. In another possible embodiment, the trailer mount includes a v-shaped base and a hub that receives the pivot shaft. This embodiment of trailer mount also includes at least two mounting flanges projecting from the base.

In one possible embodiment the elongated arm is a pin box assembly including a first section connected to the mount, a second section carrying the king pin, a pivot connecting the first section and second section together, a shock absorber having a first end connected to the first section and a second end connected to the second section and an air spring connected between the first section and the second section. The shock absorber is provided between the air spring and the mount. The air spring is provided between the shock absorber and the pivot. The pivot is provided at the front of the assembly. The air spring and the shock absorber are provided between the pivot shaft and the kingpin. Further, the shock absorber and air spring are both offset from the king pin and the pivot shaft. The air spring may take the form of a rubber air bladder.

In accordance with an additional aspect of the present invention a method is provided for increasing the clearance between a trailer and a tow vehicle equipped with a tow hitch. The method comprises the steps of providing an elongated arm having a first end and a second end, pivotably connecting the first end of the elongated arm to the trailer, securing the second end of the elongated arm to the tow hitch by means of a king pin and providing a stop on the king pin that engages the tow hitch so as to limit pivoting movement of the elongated arm relative to the tow hitch.

In accordance with yet an additional aspect of the present invention a king pin is provided for connecting to a tow hitch. The king pin comprises a body including a base, a neck, a head and a stop projecting outwardly from the base. More specifically describing the king pin, the base, neck and head extend in a first plane and the stop projects in a second plane substantially perpendicular to the first plane.

In the following description there is shown and described several possible embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain certain principles of the invention. In the drawings.

Reference will now be made in detail to the present preferred embodiments of the invention, examples of which are illustrated in the accompanying drawing figures.

DETAILED DESCRIPTION OF THE INVENTION

Figure 1:
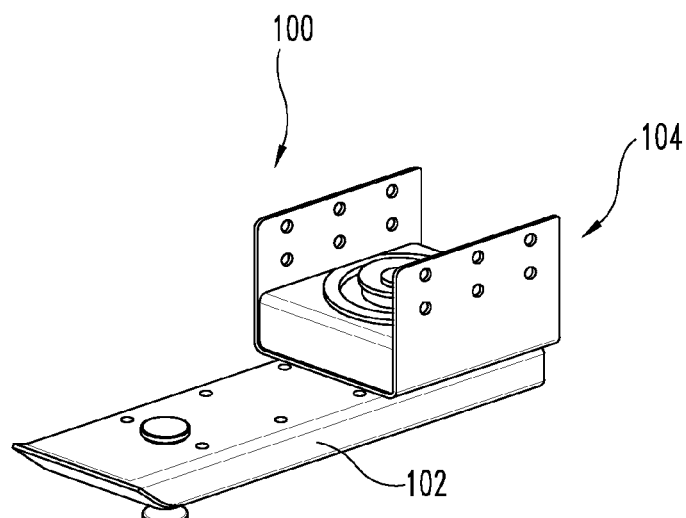
FIG. 1 is a perspective view illustrating a first embodiment of the extension coupling of the present invention.
Figure 2:
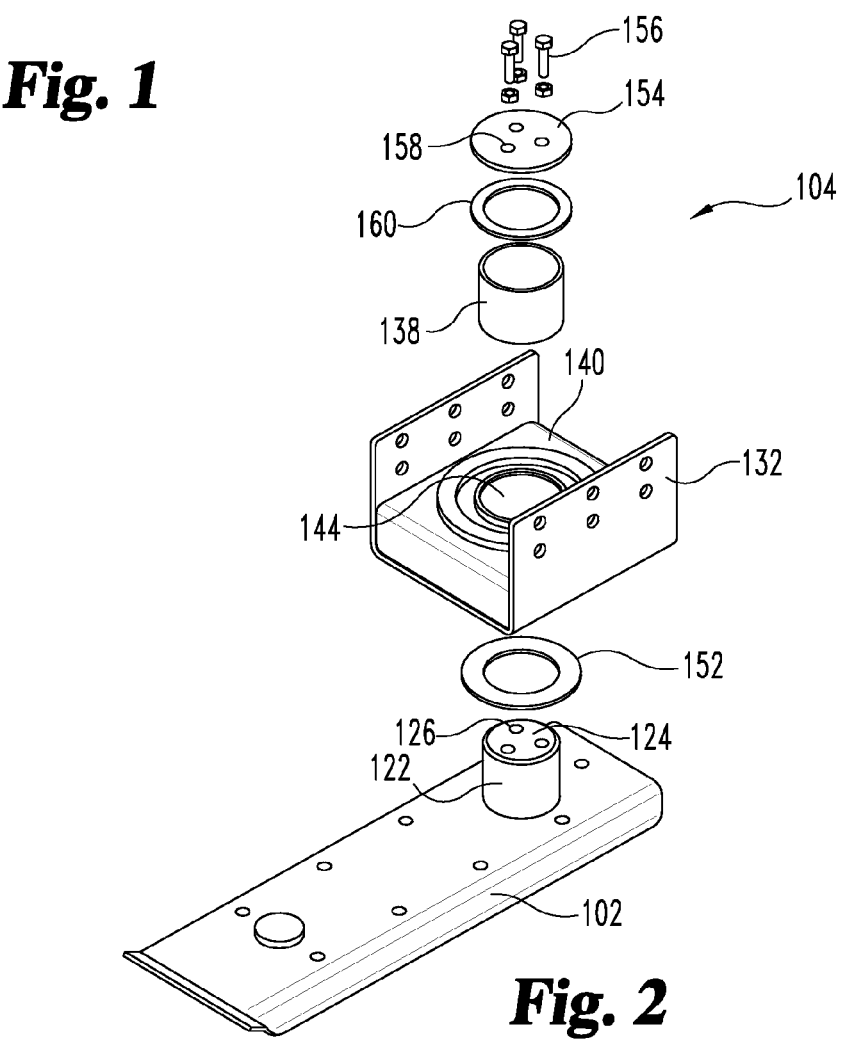
FIG. 2 is a partially exploded perspective view of the extension coupling of FIG. 1.
Figure 3:
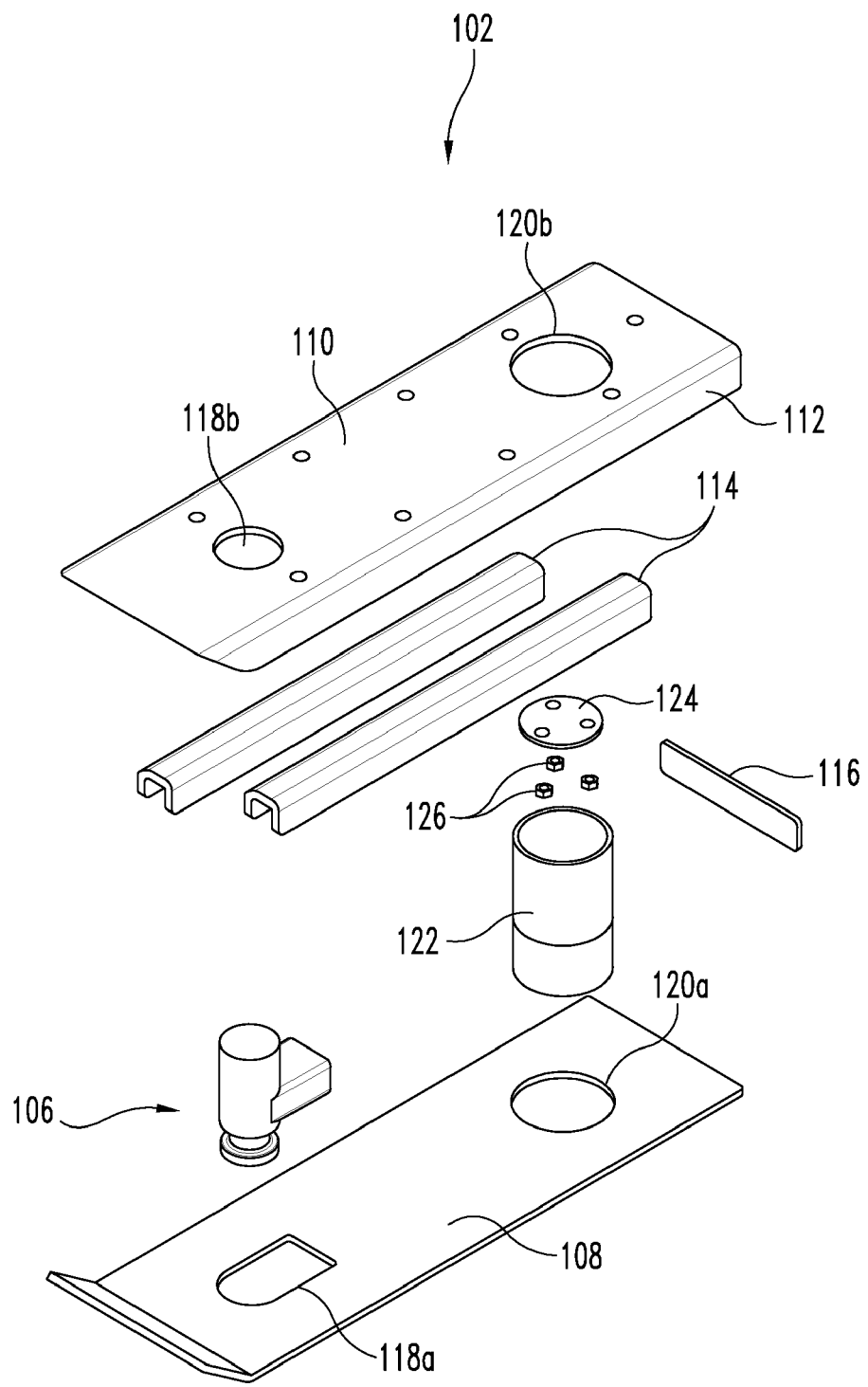
FIG. 3 is a detailed, exploded perspective view of the elongated arm of the extension coupling illustrated in FIG. 1.

Reference is now made to FIGS. 1-4 illustrating a first embodiment of the extension coupling 100 of the present invention. As illustrated the extension coupling 100 includes an elongated arm 102, a trailer mount, generally designated by reference numeral 104 and a king pin 106. More specifically, as illustrated in FIG. 3, the elongated arm 102 may be of box beam construction including a bottom wall 108, a top wall 110 with two downwardly depending sidewalls 112, two interior reinforcing beams 114 and a rear wall 116. More specifically, the bottom wall 108 and top wall 110 both include a first aperture 118 for receiving and holding the king pin 106 and a second aperture 120 for receiving and holding the pivot shaft 122. More specifically, the king pin 106 and pivot shaft 122 are positioned in the aligned apertures 118, 120 in the walls 108, 110 and welded in position. A mounting plate 124 including three mounting nuts 126 is welded into the top of the pivot shaft 122.

Figure 4:
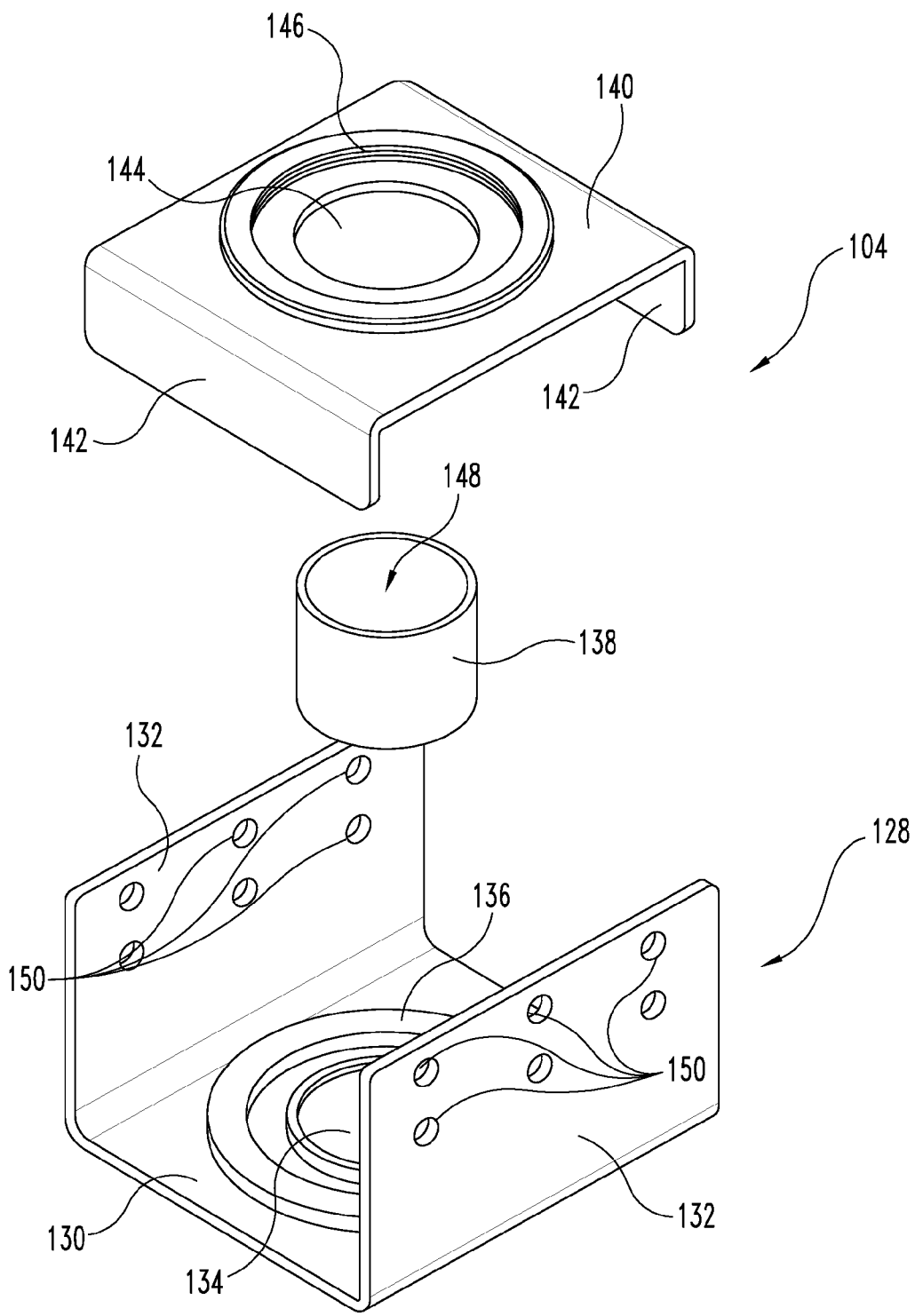
FIG. 4 is a detailed, exploded perspective view of the trailer mount of the extension coupling illustrated in FIG. 1.

As best illustrated in FIG. 4, the trailer mount 104 includes a base 128 having a bottom wall 130 and two upwardly projecting mounting flanges 132. The bottom wall 130 also includes a central aperture 134 and a reinforcing rib 136. The reinforcing rib 136 is arcuate in shape and extends concentrically around the central aperture 134 as a continuous or discontinuous structure. A hub 138 is aligned over the central aperture 134 and welded to the bottom wall 130. A reinforcing plate 140 includes two downwardly depending flanges 142, a central aperture 144 and a reinforcing rib 146. The reinforcing rib 146 is continuous or discontinuous and extends in an arcuate manner circumferentially around the aperture 144. The reinforcing plate 140 is welded to the base 128 with the depending flanges 142 extending between the mounting flanges 132 of the base 128. The reinforcing plate 140 is also mounted to the top of the hub 138. When assembled the lumen 148 of the hub 138 is aligned with the opening or aperture 134 in the base 128 and the opening or aperture 144 in the reinforcing plate 140. The apertures 150 in the mounting flanges 132 provide a connection point for securing the trailer mount 104 to a trailer by cooperating bolts and lock nuts or other appropriate fasteners (not shown).

The first end of the elongated arm 102 is pivotably connected to the trailer through the trailer mount 104. More specifically, the pivot shaft 122 on the elongated arm 102 is received in the hub 138 of the trailer mount 104. A low friction bearing ring 152 such as an annular disc of nylon or polytetraflouroethylene is provided around the pivot shaft 122 between the top wall 110 of the elongated arm and the bottom wall 130 of the trailer mount 104. Grease between the pivot shaft 122 and the hub 138 aids in the free rotary movement of the elongated arm 102. The elongated arm 102 and trailer mount 104 are secured together by means of a mounting plate 154 and cooperating fasteners 156 that extend through apertures 158 in the mounting plate and engage in the bolts 126 carried on the mounting plate 124 at the top of the pivot shaft 122. The mounting plate 154 has a larger diameter than the aperture 144 and therefore engages the margin of the reinforcing plate 140 between the aperture 144 and the reinforcing rib 146 to complete a secure connection. Another low friction bearing ring 160 is provided between the pivot shaft 122 and the mounting plate 154.

Figure 5A:
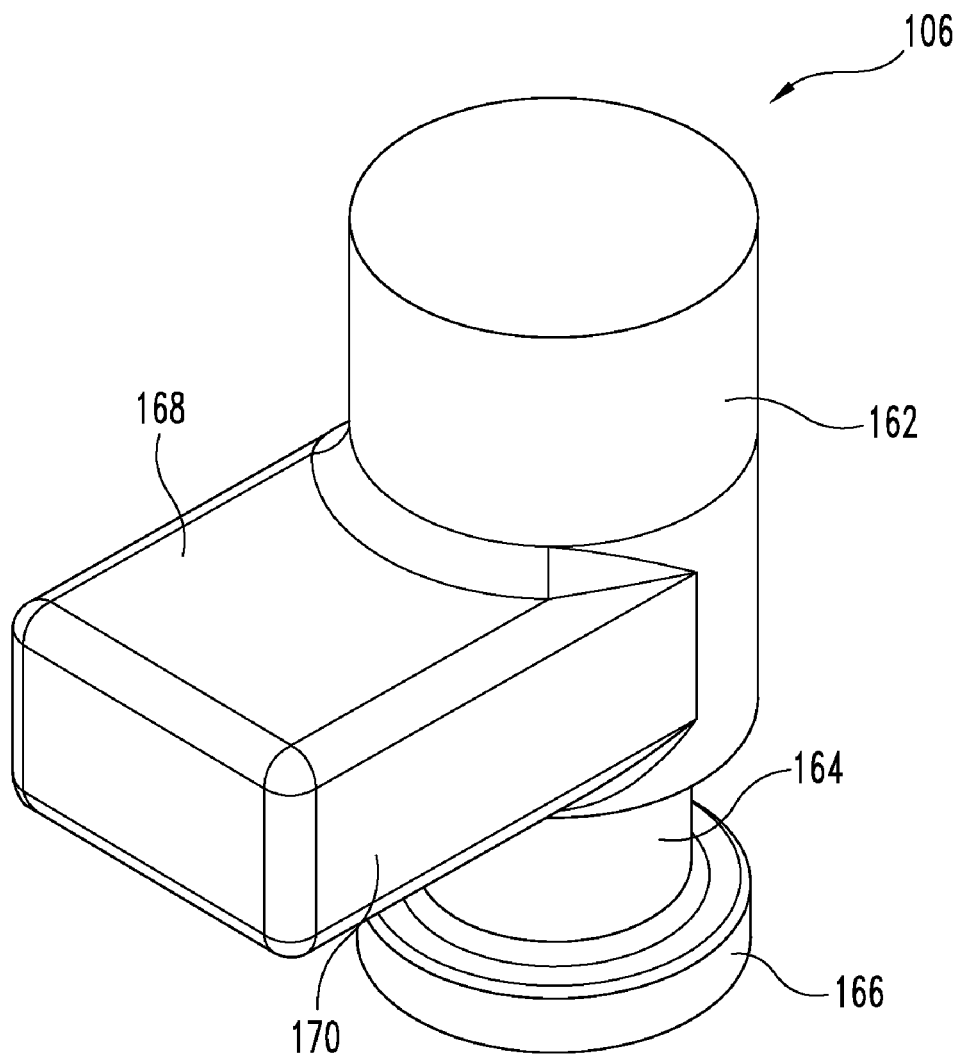
FIG. 5a is a detailed perspective view of the king pin of the extension coupling of the present invention.
Figure 5B:
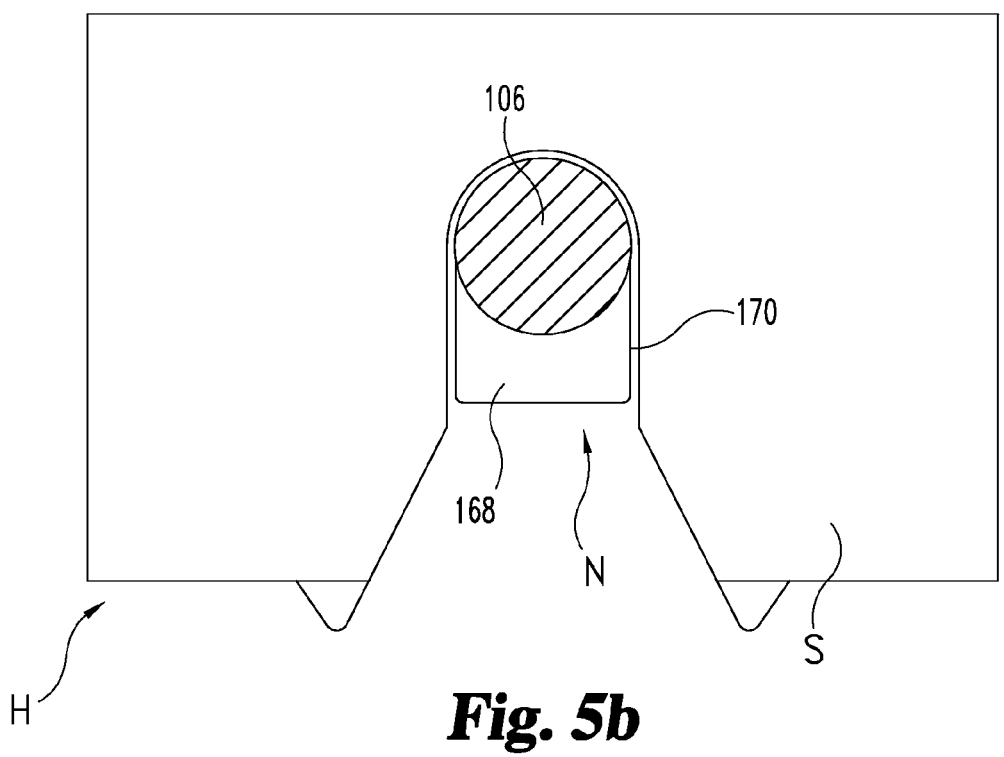
FIG. 5b is a detailed, partially sectional and schematical top plan view illustrating how the stop provided on the base of the king pin engages in the throat of a tow hitch to prevent rotation about the king pin.

Reference is now made to FIGS. 5a and 5b illustrating the king pin 106 in detail. As illustrated the king pin 106 has a body including a base 162, a neck 164 and a head 166. As illustrated, the base 162, neck 164 and head 166 are all aligned and extend in a first plane. A stop 168 projects from the base 162. The stop 168 extends in a second plane substantially perpendicular to the first plane.

In operation, the extension coupling 100 allows one to effectively increase the clearance between the cab of a towing vehicle and the trailer. This allows one to make sharper turns at low speeds such as when negotiating around obstacles in tight areas such as in campgrounds and the like.

Figure 5C:
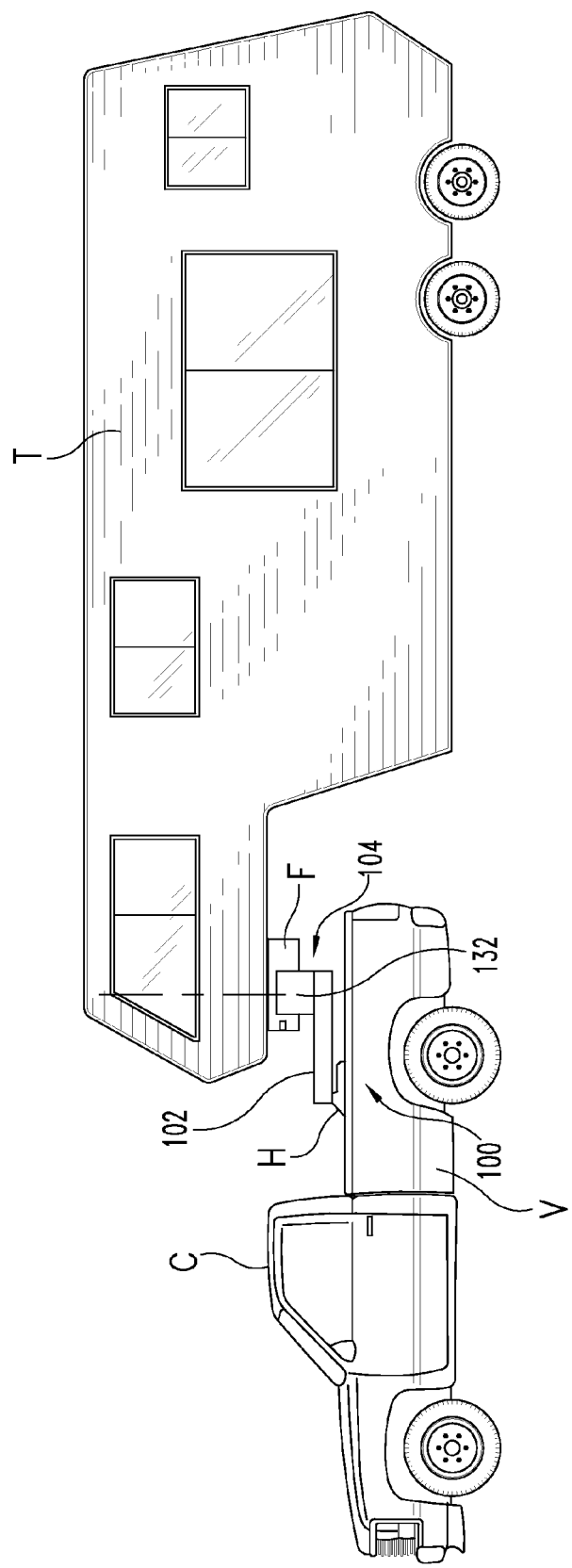
FIG. 5c is a side elevational view illustrating the extension coupling connecting a trailer to a tow hitch carried on a vehicle.

More specifically, as best illustrated in FIG. 5c, the trailer mount 104 is fixed to the frame F of the trailer T by means of the mounting flanges 132. The elongated arm 102 pivots freely relative to the trailer mount 104 and trailer T on the pivot shaft 122 received in the hub 138 at the first end of the elongated arm (see also FIG. 2). The king pin 106 is secured adjacent the second end of the elongated arm 102. The king pin 106 is received in the jaw of the tow hitch H carried in the bed of the tow vehicle V behind the cab C. More particularly, as is known in the art, the jaw is closed in order to engage and hold the king pin 106 by the neck 164. As illustrated in FIG. 5c, the stop 168 on the base 162 of the king pin 106 is received within and aligned with the throat N of the skid plate S. The sidewalls 170 of the stop 168 substantially fill the throat N and are in close clearance with the edges of the skid plate S defining the throat N leading to the jaw of the tow hitch H. Engagement of the sidewalls 170 with the skid plate S function to limit or substantially eliminate any pivoting motion between the elongated arm 102 and the tow hitch H about the king pin 106. Accordingly, while the trailer T is connected to the tow hitch H at a first end of the elongated arm 102, pivotal movement between the trailer T and the towing vehicle V occurs only at the second end of the elongated arm 102 underneath the trailer T at the pivot shaft 122.

Figure 6:
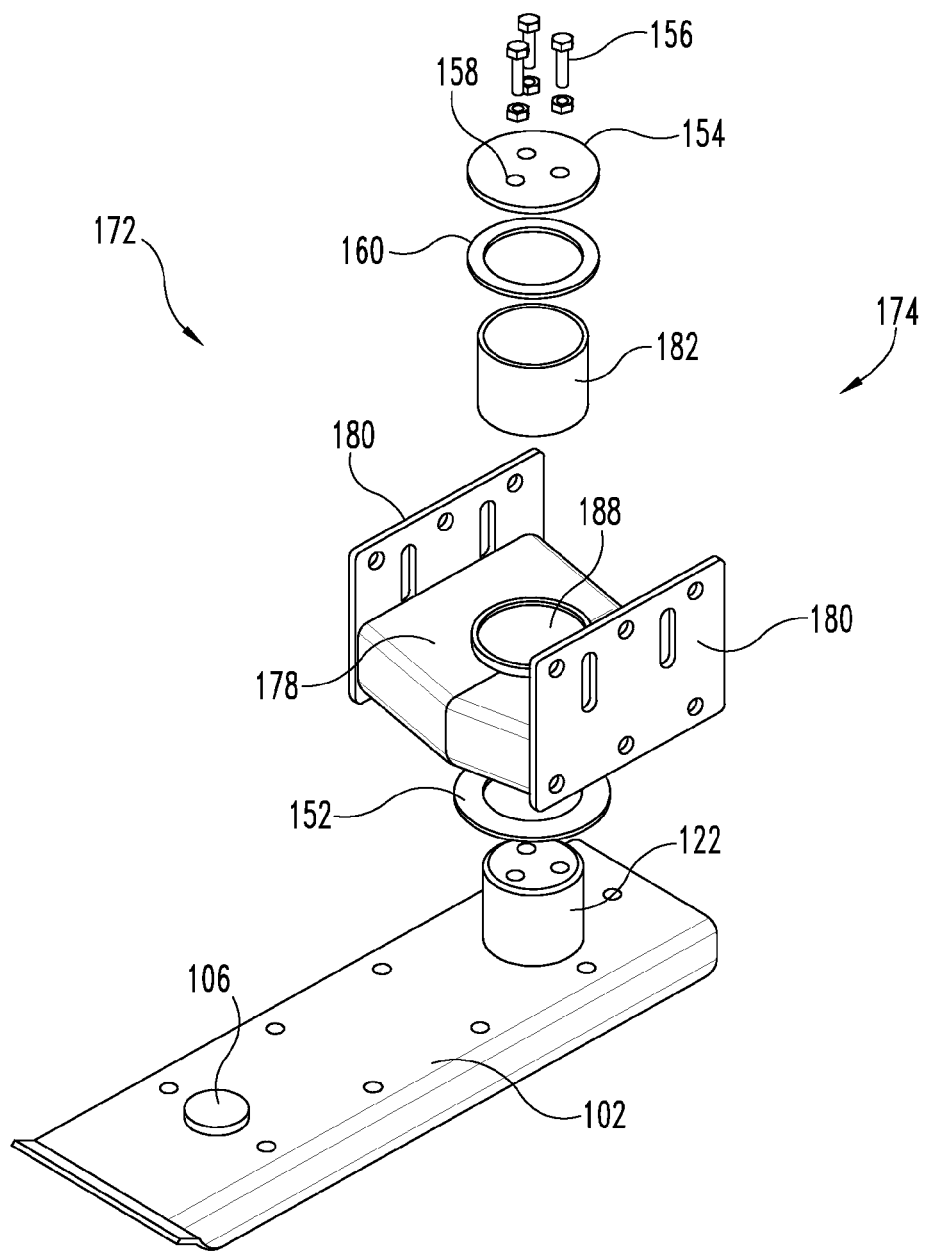
FIG. 6 is a partially exploded perspective view of a second embodiment of the extension coupling of the present invention.
Figure 7:
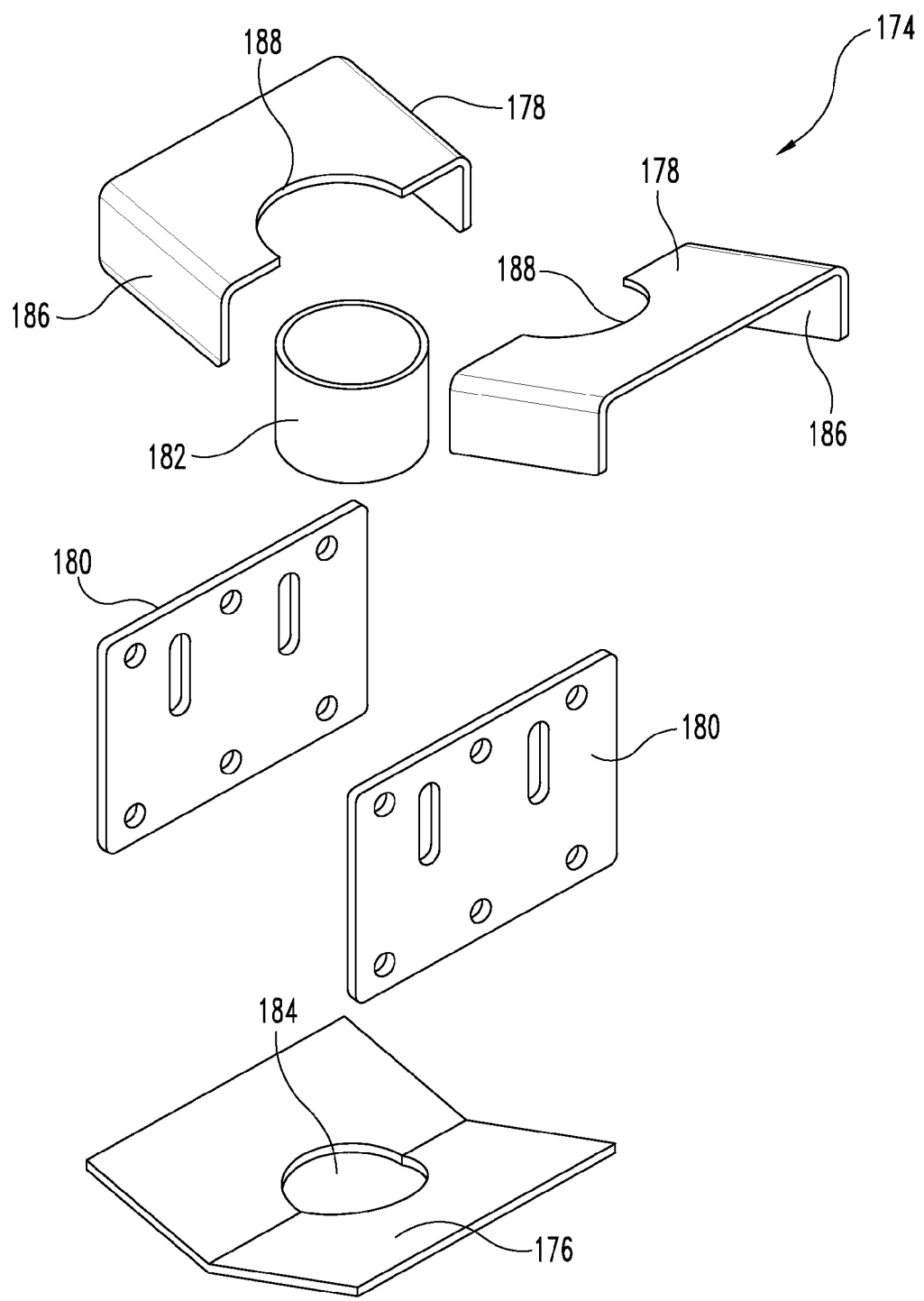
FIG. 7 is a detailed, exploded perspective view of the trailer mount of the extension coupling of FIG. 6.

An alternative embodiment of the extension coupling 172 of the present invention is illustrated in FIGS. 6 and 7. The extension coupling 172 differs from the extension coupling 100 only in the structure of the trailer mount 174. The construction of elongated arm 102 and the king pin 106 remain unchanged.

As illustrated in FIGS. 6 and 7, the trailer mount 174 includes a substantially v-shaped base 176, a substantially v-shaped reinforcement plate 178 provided in two sections, two upstanding and projecting mounting plates 180 and a hub 182. More specifically, the v-shaped base 176 includes an aperture 184 while the reinforcement plate 178, including reinforcing flanges 186, includes a central aperture 188. The trailer mount 174 is welded together with the hub 182 extending between the apertures 184, 188 and the reinforcing flanges 186 extending between the mounting plates 180. As illustrated in FIG. 6, the pivot shaft 122 of the elongated arm 102 is received in the hub 182 in the same manner as the pivot shaft 122 received in the hub 138 of the first embodiment. Thus, the second embodiment also includes a bearing ring 152, a mounting plate 154, fasteners 156 and a bearing ring 160. It should be appreciated that the second embodiment is mounted for operation in the same manner as the first embodiment with the mounting plates or flanges 180 engaging the frame F of the trailer T.

Reference is now made to FIGS. 8-13 illustrating yet another embodiment of the present invention. The extension coupling 10 includes an elongated arm in the form of a pin box assembly 12 including an extension arm assembly 14. The extension arm assembly 14 is connected to a trailer mount 16. As best illustrated in FIG. 8a, the pin box assembly 12 includes a first section 18 having a top wall 20 and two downwardly depending sidewalls 22. A cross member 24 extends between the sidewalls 22 and provides additional strength and rigidity to the structure. A shock absorber mounting bracket 26 also extends between the sidewalls 22. The mounting bracket 26 includes a pair of ears 28 that cooperate to form a trunnion mounting for one end of a shock absorber 30 in a manner that will be described in greater detail below (see also FIGS. 9 and 10). The top wall 20, sidewalls 22, cross member 24, mounting bracket 26 and ears 28 may all be constructed from steel for high strength and may all be connected together by welding if desired. The sidewalls 22 may also include rounded edges or return flanges 23 in order to provide added strength while minimizing weight.

The pin box assembly 10 also includes a second section 30 incorporating a skid plate 32, an upper king pin support plate 34 and two upwardly depending side skirts 36. A king pin 106 includes a base 162 that is received and welded into cooperating, aligned apertures 38 provided in the skid plate 32 and the upper king pin support plate 34. This two point mounting of the king pin 106 enhances the low transfer characteristics of the assembly 10. A pair of ears 40 are welded adjacent a rear end of the upper support plate 34 and function as a trunnion to receive one end of the shock absorber 30 (see also FIGS. 9 and 10). A pivot tube 42 is received and welded in cooperating slots 44 provided in the front end of the side skirts 36. Like the sidewalls 22, the side skirts 36 include return flanges 37 for added strength. An air spring mounting plate 46 is secured to the sidewalls 36. The skid plate 32, upper king pin support plate 34, side skirts 36, king pin 106, ears 40, pivot tube 42 and air spring mounting plate 46 may all be constructed from high strength steel and, for example, may all be secured together by welding if desired.

Figure 9:
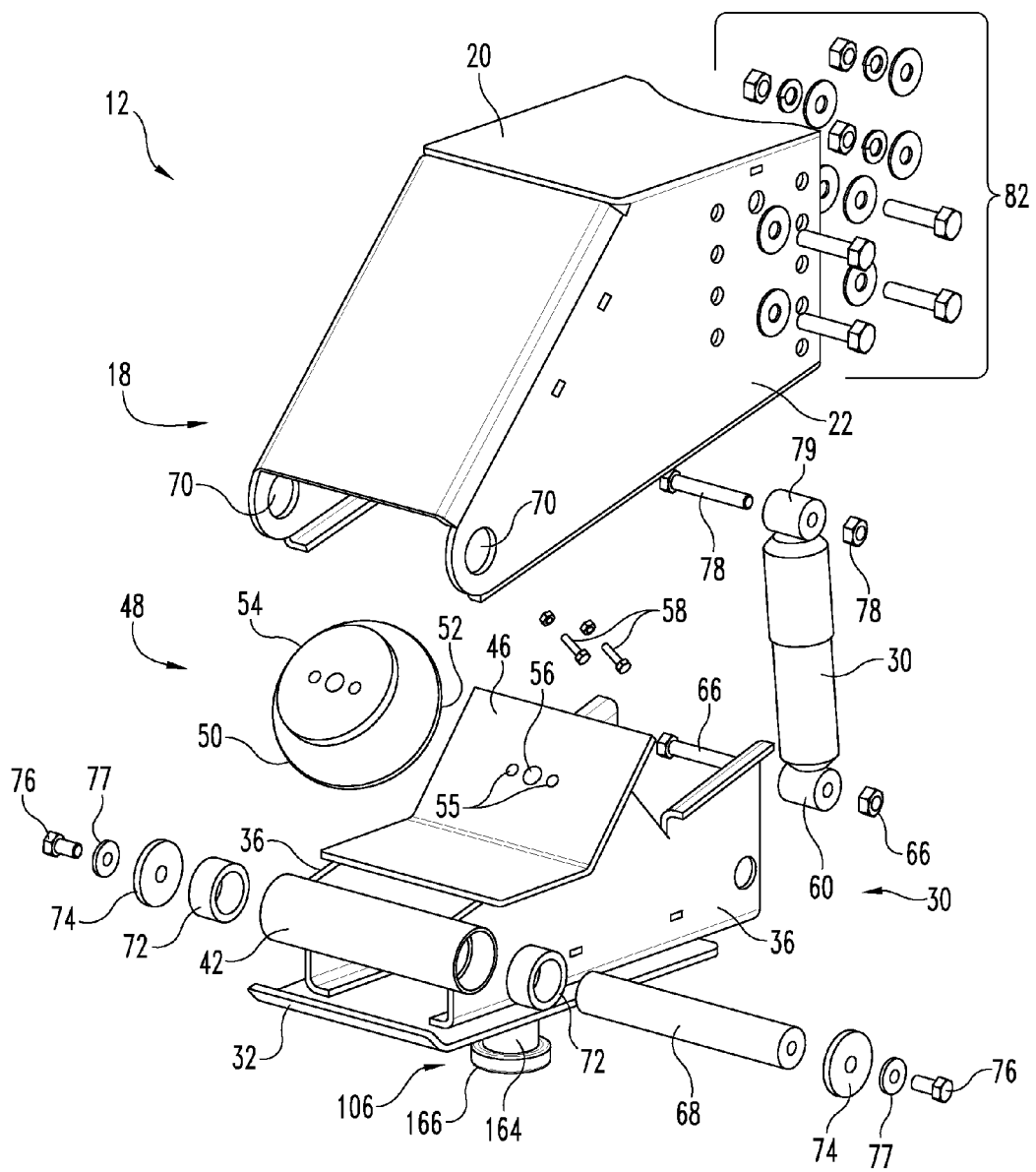
FIG. 9 is an exploded perspective view of the pin box assembly section of the embodiment illustrated in FIG. 8.
Figure 10:
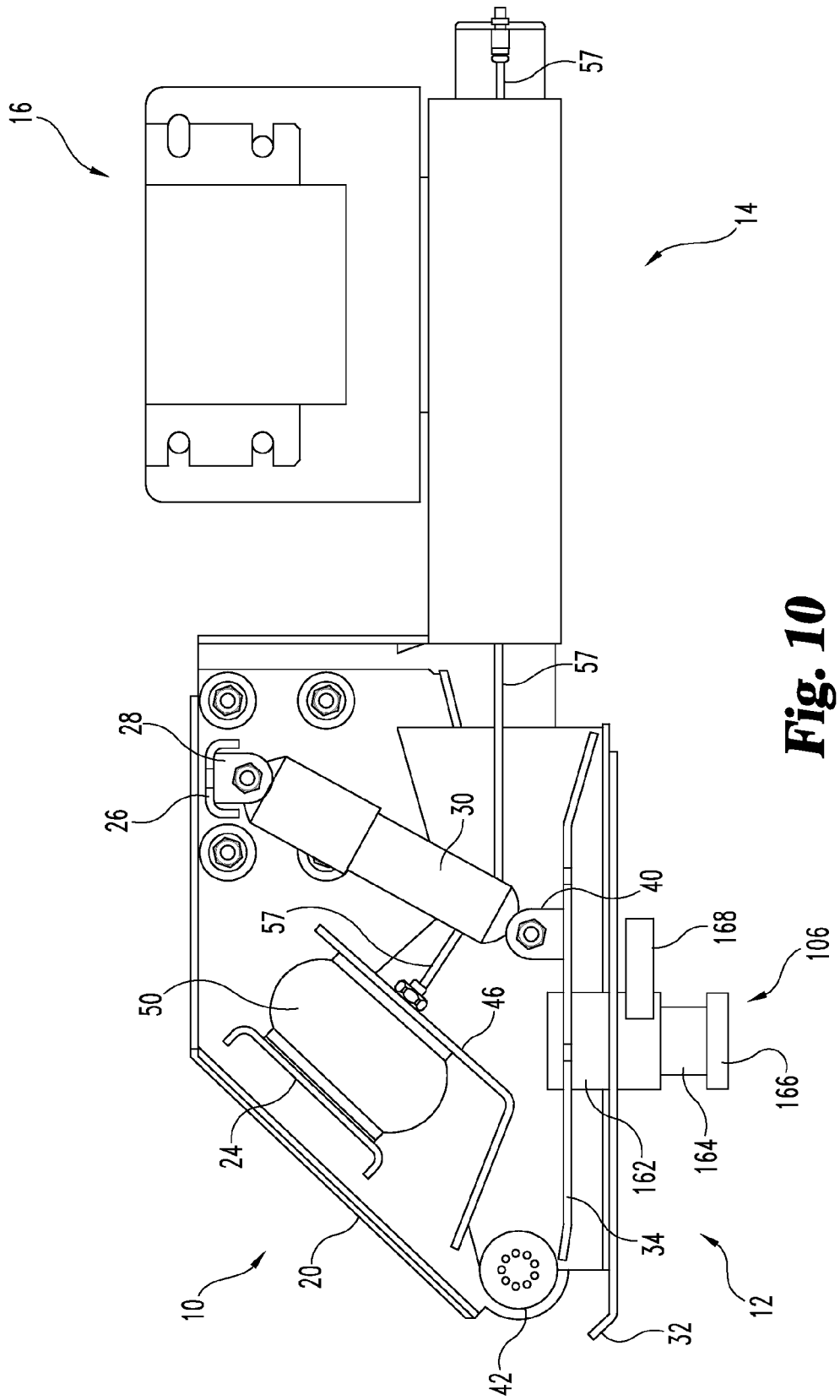
FIG. 10 is a side elevational view of the extension coupling illustrated in FIGS. 8 and 9 with the near side wall and side skirt removed to show the enclosure and connection of the shock absorber and air spring.

An air spring, generally designated by reference numeral 48, includes an air bladder 50, a bottom or base plate 52 and a top plate 54 (see FIGS. 9 and 10). The mounting plate 46 includes two aligned apertures 55 and a slot 56 there between. The base plate 52 of the air spring 48 is secured to the mounting plate 46 by fasteners such as a pair of cooperating bolts and nuts 58 secured in the apertures 55. The air bladder 50 of the air spring 48 is connected by a line 57 that passes through the slot 56 and connects through a valve (not shown) with an air source (not shown). The lower end 60 of the shock absorber 30 is connected to the ears 40 by means of the cooperating nut and bolt 66.

The first section 18 and second section 30 are pivotally connected together at the front end thereof by means of a pivot shaft 68 that passes through the aperture 70 in one of the side walls 22, the pivot tube 42 of the second section 30 and the aperture 70 of the other sidewall 22. Bushings 72 provided between the pivot shaft 68 and the pivot tube 42 insure free pivoting action between the two sections 18, 30. Outer retainer washers 74 and cooperating bolts 76 and lockwashers 77 complete the pivotal connection. A cooperating nut and bolt 78 completes the connection of the upper end 79 of the shock absorber 30 to the ears 28 on the first section 18. Aligned apertures 80 in the sidewalls 22 function as the attachment points for securing the pin box assembly 12 to the extension arm assembly 14 by using cooperating bolts, nuts and washers 82 in a manner that will be described in greater detail below.

As should be appreciated from reviewing the drawing figures and particularly FIG. 10, the margins of the sidewalls 22 and side skirts 36 overlap so that the sidewalls 22, side skirts 36, top wall 20 and skid plate 28 define an enclosure 82. In the illustrated embodiment, the shock absorber 30 is provided at the opening of the enclosure 82. The air spring 48 is provided in the enclosure 82 between the shock absorber 30 and the forward pivot tube 42. In this position, deep in the enclosure 82, the air spring 48 is well protected from UV exposure, malicious tampering and road hazards thereby substantially increasing its service life. The rear-mounted shock absorber 30 is also shielded from road hazards and together the first and second sections 18, 30 provide a clean, aesthetically pleasing streamlined design.

Figure 11:
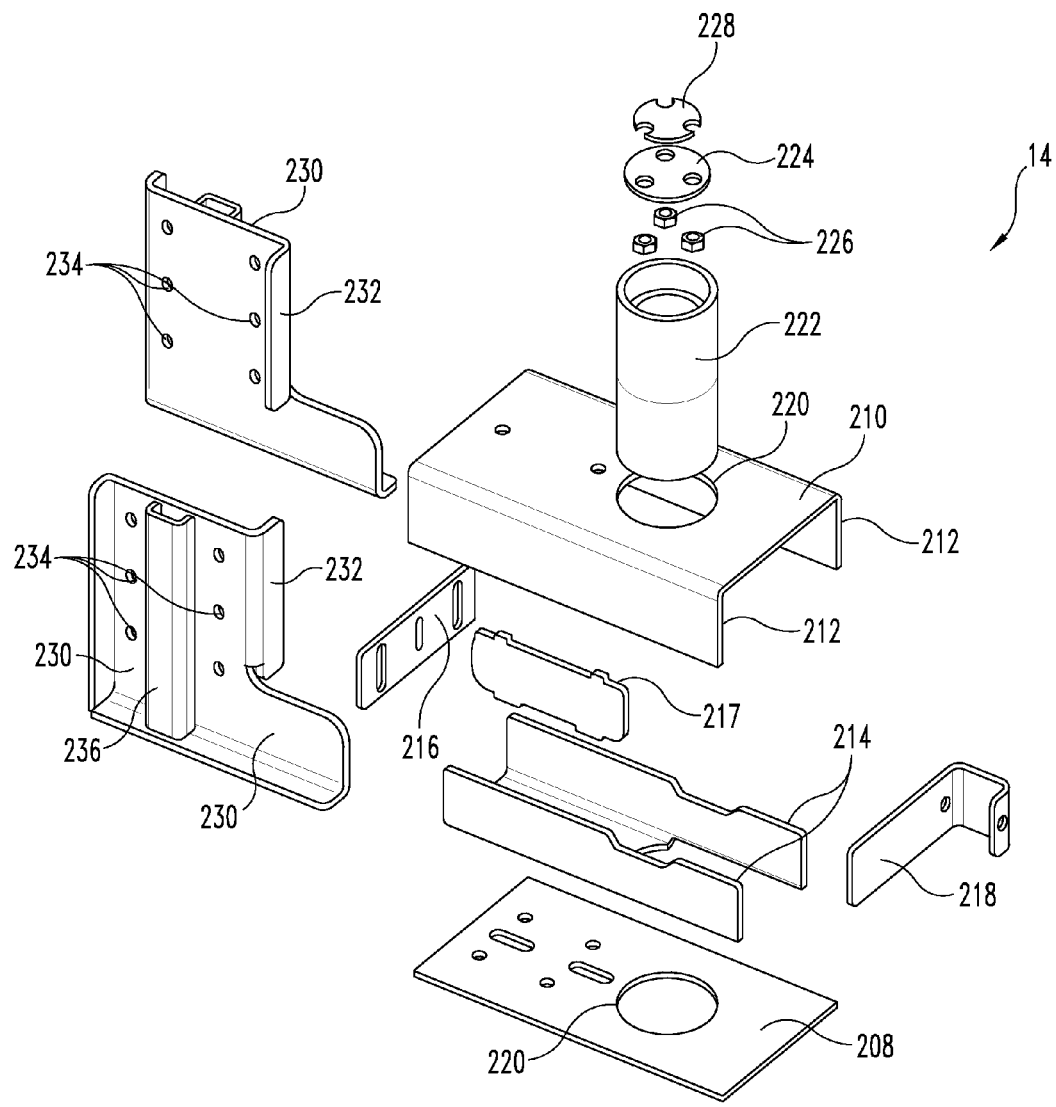
FIG. 11 is an exploded perspective view of the extension arm of the first section of the extension coupling of FIG. 8.
Figure 12:
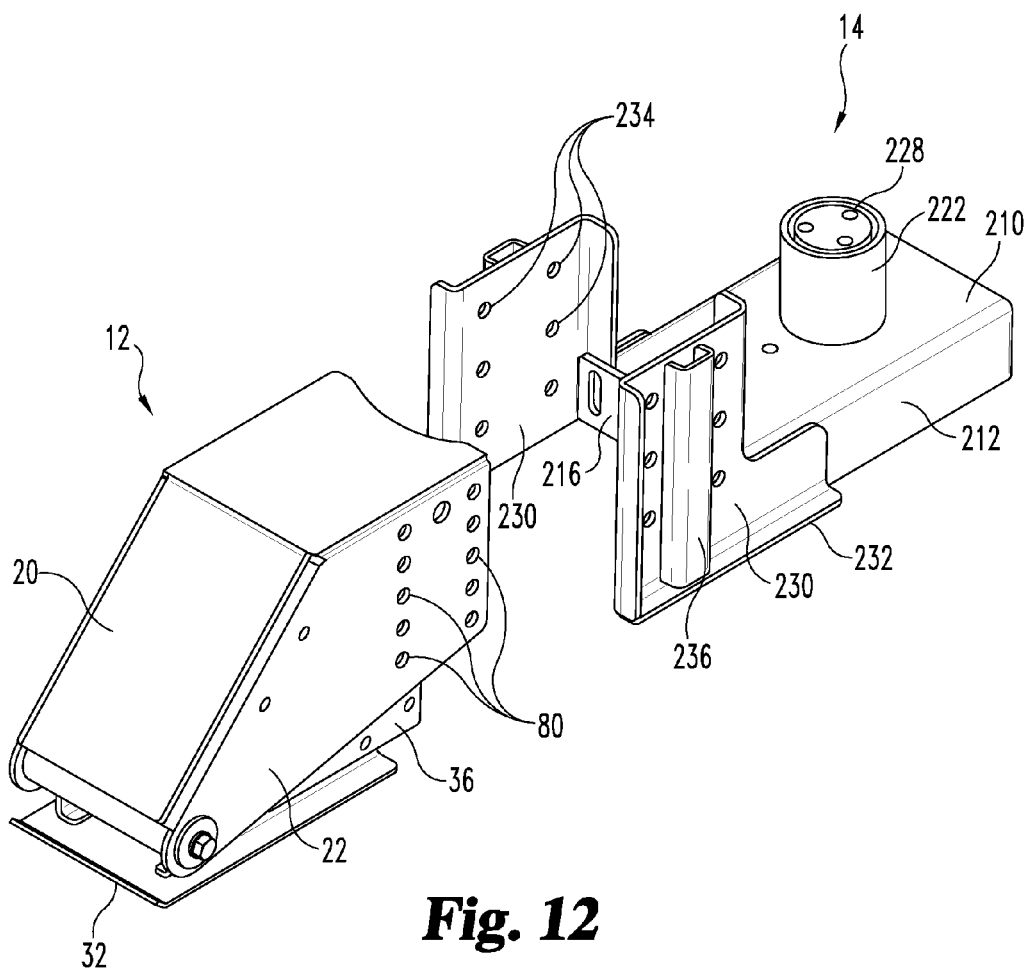
FIG. 12 is a partially exploded perspective view illustrating the first and second sections of the pin box assembly and the extension arm of the first section.

As best illustrated in FIG. 11, the extension arm assembly 14 is of box beam construction and includes a bottom wall 208, a top wall 210 with two downwardly depending sidewalls 212, two interior reinforcing beams 214, a front wall 216 with a reinforcing strut 217 and a rear wall 218. The bottom wall 208 and top wall 210 both include an aperture 220 for receiving and holding a pivot shaft 222. More specifically, the pivot shaft 222 is positioned in the aligned apertures 220 and welded in position. A mounting plate 224 including three mounting nuts 226 is welded into the top of the pivot shaft 222. The plate 228 is provided to reinforce the mounting plate 224.

A pair of L-shaped mounting brackets 230 are welded to the opposed sidewalls 212. The brackets 230 include reverse flanges 232 and reinforcing struts 236 for added strength. Each of the brackets 230 includes apertures 234 for receiving the cooperating bolts, nuts and washers 82 used to secure the first section 18 of the pin box assembly 12 to the extension arm assembly 14 (se FIGS. 12 and 13).

Figure 8:
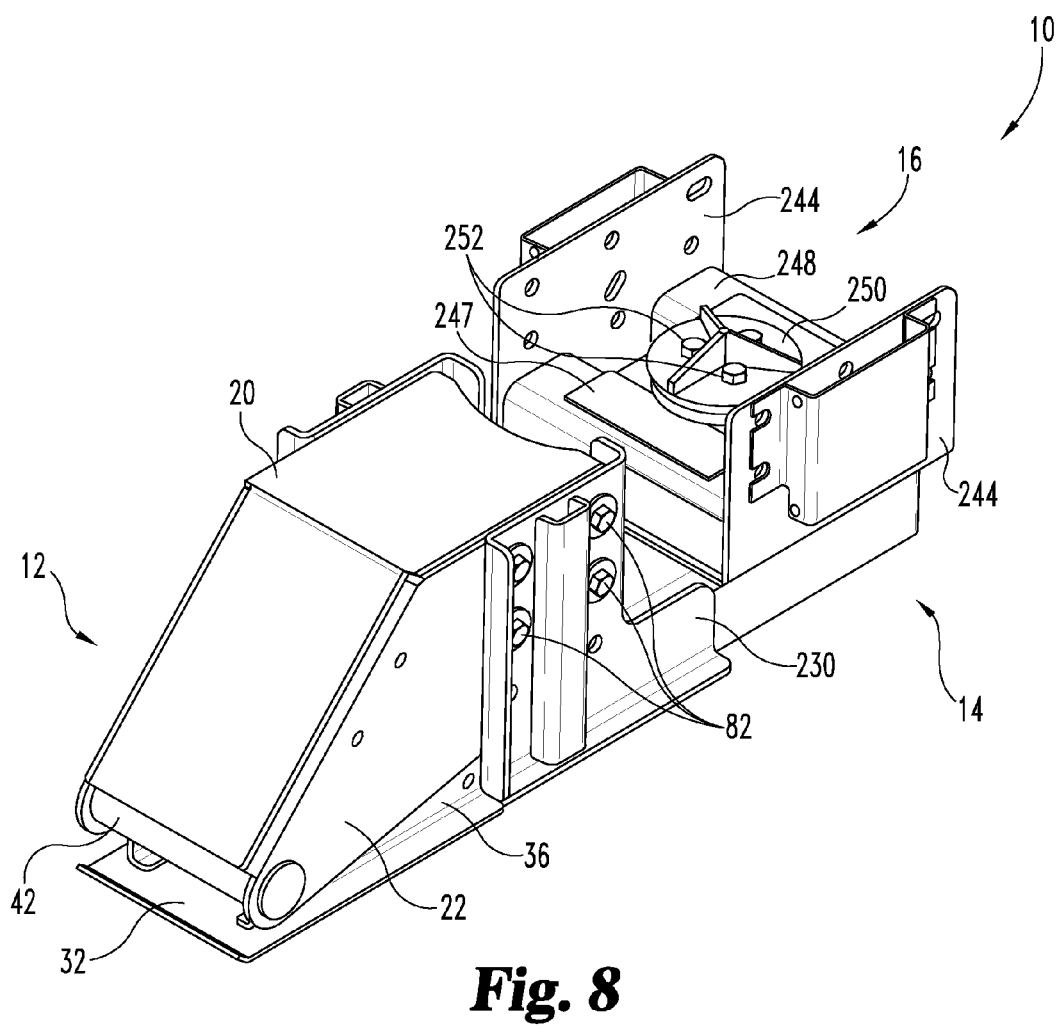
FIG. 8 is a perspective view illustrating yet another embodiment of the present invention.
Figure 8A:
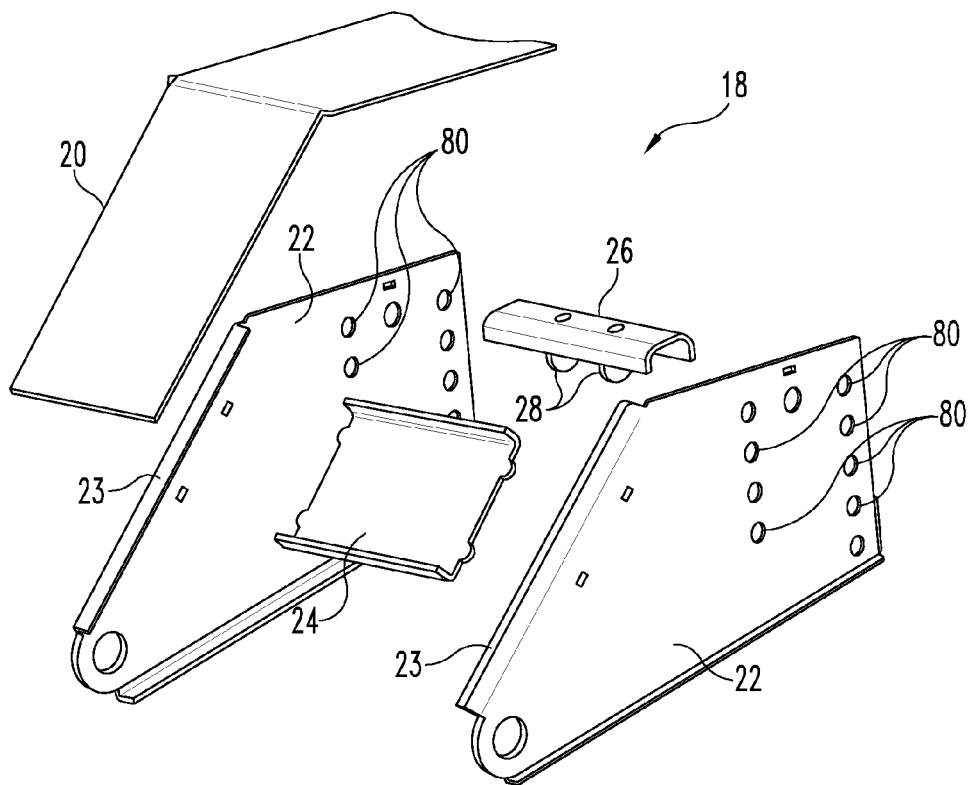
FIGS. 8a and 8b are detailed exploded perspective views, respectively, of the first and second sections of the pin box assembly portion of the elongated arm.
Figure 8B:
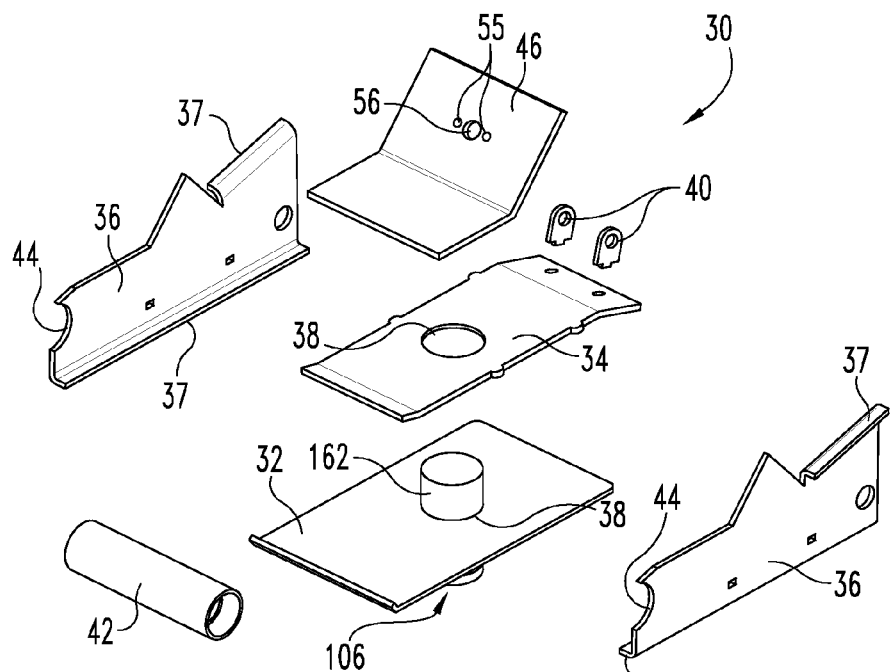
Figure 13:
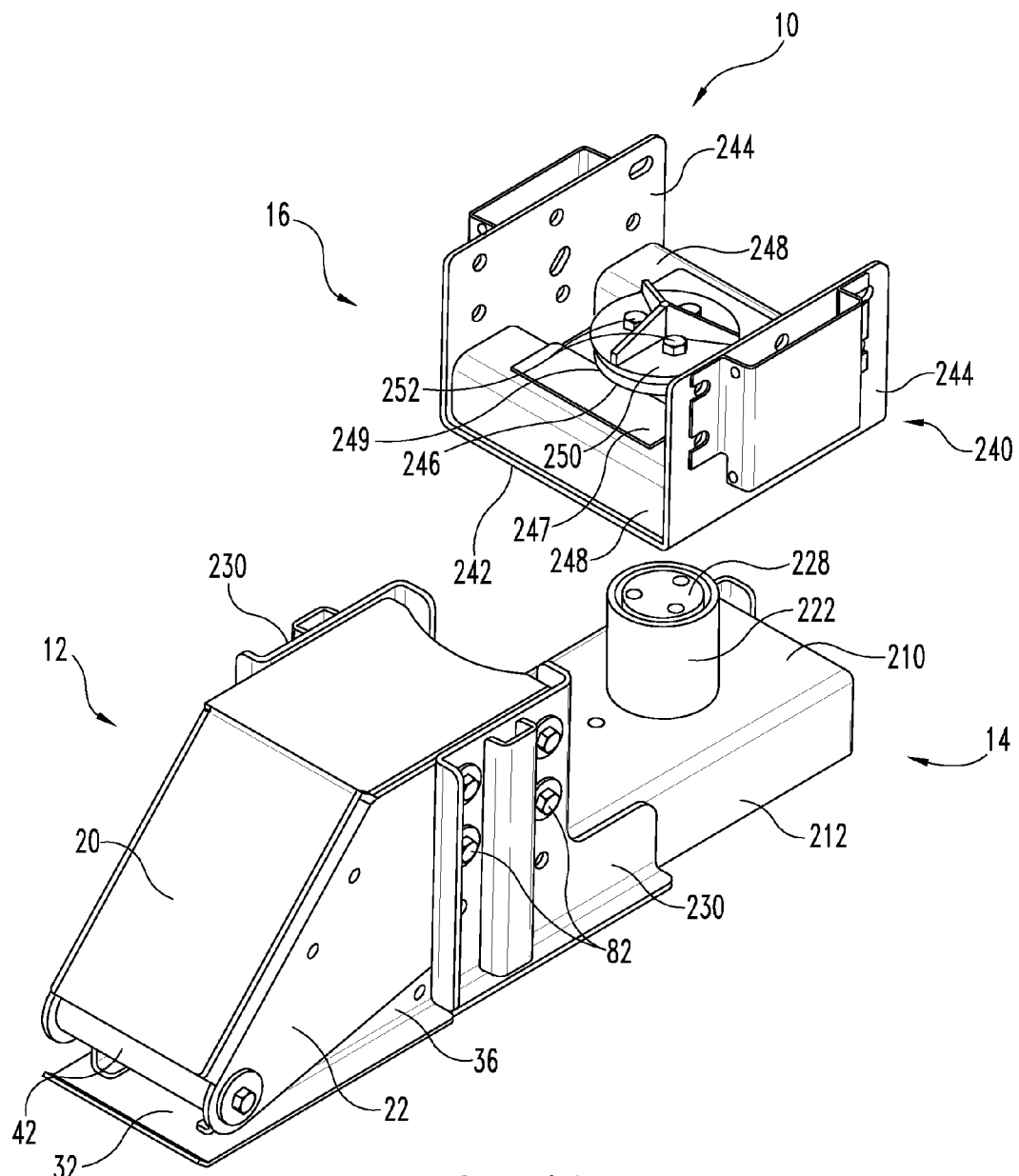
FIG. 13 is a partially exploded perspective view illustrating the extension coupling of FIG. 8 including the trailer mount.

As best illustrated in FIGS. 8 and 13, the embodiment 10 further includes the trailer mount 16. The trailer mount 16 includes a base 240 having a bottom wall 242 and two upwardly projecting mounting flanges 244. A hub 246 is mounted on the bottom wall 242 over a central aperture (not shown) in the bottom wall. Reinforcing struts 248 extend between the flanges 244 on opposing sides of the hub 246 along the bottom wall 242. A top plate 247 extends between the struts 248 and includes an aperture 249 for receiving the hub 246. All the components 240, 242, 24, 246, 247 and 248 may be made of high strength steel and welded together.

The first end of the extension arm assembly 14 is mounted to the trailer through the trailer mount 16. More specifically, the pivot shaft 222 of the extension arm assembly 14 is received in the hub 246 of the trailer mount 16. A low friction bearing such as an annular disc of nylon or polytetrafluoroethylene (not shown) is provided around the pivot shaft 222 between the top wall 210 and the bottom wall 242 of the trailer mount 16. Grease between the pivot shaft 222 and the hub 246 aids in providing free rotary movement of the extension arm and pin box assemblies 14, 12 relative to the trailer mount 16.

The extension arm assembly 14 and trailer mount 16 are secured together by means of a mounting plate or cap 250 and cooperating fasteners 252 that extend through apertures in the cap and engage in the nuts 226 welded to the mounting plates 224, 288 carried at the top of the pivot shaft 222. The mounting cap 250 has a larger diameter than the hub 246 in order to complete a secure connection. A low friction bearing (not shown) such as a nylon or polytetrafluoroethylene disc is provided between the cap 250 and the hub 246 to provide freedom of rotational movement.

The second embodiment 10 of FIGS. 8-13 is secured between a trailer and a towing vehicle in the same manner as the first embodiment. More specifically, the trailer mount 16 is secured to the frame of the trailer by bolts, cooperating nuts and washers in the previously described manner. The king pin 106 is then positioned in the jaw assembly of a fifth wheel trailer hitch H mounted to the bed of the towing vehicle V. The jaw assembly of the fifth wheel trailer hitch H is then locked in a manner known in the art.

The expandable and compressible air spring 48 regulates the compression and expansion rates of the pin box assembly 12. Where an air source, such as an air compressor, is contained within the trailer, the driver may adjust the air pressure in the air spring 48 and accordingly, the compression and expansion rates in order to provide more ideal ride characteristics. More specifically, this allows the operator to tune the performance of the pin box assembly 12 so as to avoid operating at the natural harmonic/Hz frequency of the tow vehicle. A valve is used to control the airflow from the source to the bladder 50 of the air spring 48 or from the air spring to the environment to release pressure. When inflated for use, the top plate 52 engages the bearing surface of the cross member 24.

The shock absorber 30 functions to provide conventional dampening during the towing of the trailer. By placing the pivot shaft or pivot point 42 forward of the king pin 106 center line, the pivot now works in better harmony with the fifth wheel hitch H to which the pin box assembly 12 and trailer are connected thereby significantly reducing longitudinal chucking during trailer towing. More specifically, the pin box assembly 12 successfully combines the best performance characteristics of the leading air-ride and anti-chucking couplers to provide better softening in the vertical direction and anti-chucking in the longitudinal direction so as to provide better overall performance than devices of the prior art.

The foregoing description of a preferred embodiment of the present invention has been presented for purposes of illustration and description. It is not intended to be exhaustive or to limit the invention to the precise form disclosed. Obvious modifications or variations are possible in light of the above teachings. For example, for some applications the air spring is aft of the shock absorber: that is, the positions of the air spring and shock absorber are reversed. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed is:

1. An extension coupling for interconnecting a trailer to a tow hitch carried by a tow vehicle, said extension coupling comprising:
    an elongated arm having a first end and a second end wherein said first end is pivotably connected to the trailer, the second end includes a pin box assembly having a first section, a second section, and a pivot connecting said first section and said second section together, wherein the pivot limits relative motion between the first and second sections to substantially rotational movement; and
    a king pin connected to said second end, said king pin including a projecting stop that engages the tow hitch to strictly limit pivoting movement of said elongated arm relative to the tow hitch, wherein the king pin is rearward of the pivot when the king pin is engaged with the tow hitch.

2. The extension coupling of claim 1, further including a trailer mount wherein said trailer mount is fixed to the trailer and said first end of said elongated arm is pivotally connected to said trailer mount by a pivot shaft carried on said elongated arm.

3. The extension coupling of claim 2, wherein said trailer mount includes a mounting plate having a reinforcing rib and at least two projecting mounting flanges.

4. The extension coupling of claim 3, wherein said mounting plate includes a hub that receives said pivot shaft and said reinforcing rib is arc shaped and extends concentrically around said hub.

5. The extension coupling of claim 4, wherein said king pin includes a head, a neck and a base and said stop projects from said base.

6. The extension coupling of claim 1, wherein said king pin includes a head, a neck and a base and said stop projects from said base.

7. The extension coupling of claim 2, wherein said first section is connected to said mount, said second section carrying said king pin, a shock absorber having a first end connected to said first section and a second end connected to said second section and an air spring connected between said first section and said second section.

8. The extension coupling of claim 7, wherein said shock absorber is provided between said air spring and said mount.

9. The extension coupling of claim 8, wherein said air spring is provided between said shock absorber and said pivot.

10. The extension coupling of claim 9, wherein said pivot is provided at a front end of said assembly.

11. The extension coupling of claim 10, wherein said air spring and said shock absorber are provided between said pivot shaft and said king pin.

12. The extension coupling of claim 11, wherein said shock absorber and said air spring are both offset from said king pin and said pivot shaft.

13. The extension coupling of claim 12, wherein said air spring is a rubber air bladder.

14. The extension coupling of claim 2, wherein said trailer mount includes a V-shaped base and a hub that receives said pivot shaft.

15. The extension coupling of claim 14, wherein said trailer mount includes at least two mounting flanges projecting from said base.

16. An extension coupling for interconnecting a trailer to a tow hitch carried by a tow vehicle, said extension coupling comprising:
    an elongated arm having a pin box assembly and an extension arm assembly wherein the extension arm assembly is pivotally connected to the trailer; and
    the pin box assembly includes a first section, a second section including a connector, and a pivot connecting the first section to the second section, wherein the pivot limits relative motion between the first and second sections to substantially rotational movement, the connector is constructed and arranged to engage the tow hitch to limit pivoting movement of the pin box assembly relative to the tow hitch, wherein the pivot is forward of the connector.

17. The extension coupling of claim 16, further including a trailer mount wherein the trailer mount is fixed to the trailer and the extension arm assembly is pivotally connected to the trailer mount by a pivot shaft carried on the extension arm assembly.

18. The extension coupling of claim 16, wherein the connector includes a king pin having a base, a neck and a head and a stop projects outwardly from said base to engage the tow hitch.

19. The extension coupling of claim 18, wherein the second section includes an upper support plate and a skid plate, the upper support plate and the skid plate each define an aperture, the pair of apertures are aligned to receive the base of the king pin.

20. An extension coupling for interconnecting a trailer to a tow hitch carried by a tow vehicle, said extension coupling comprising:

an elongated arm having a pin box assembly and an extension arm assembly wherein the extension arm assembly is pivotally connected to the trailer; and the pin box assembly includes a first section, a second section including a connector, a pivot connecting the first section to the second section, a shock absorber having a first end connected to the first section and a second end connected to the second section, the shock absorber being spaced a distance from the pivot, the connector is constructed and arranged to engage the tow hitch to limit pivoting movement of the pin box assembly relative to the tow hitch, wherein the pivot is forward of the connector when the connector is engaged with the tow hitch.

\* \* \* \* \*